Figure 1:
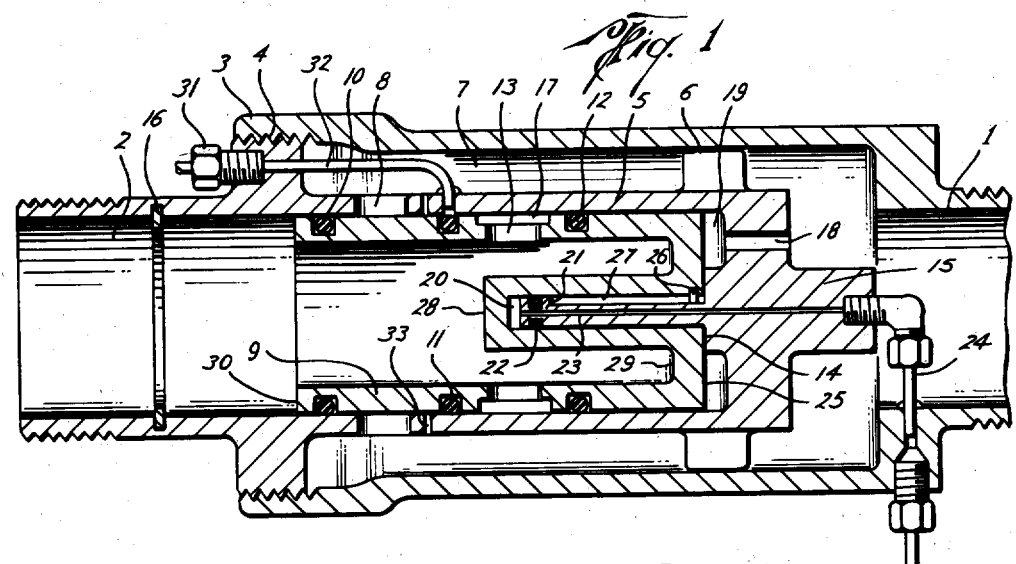

Jan. 12, 1960   R. P. YOUNGHAUS   2,920,645
SLEEVE CHECK VALVE
Filed Jan. 11, 1957

Richard P. Younghaus
INVENTOR.

BY Thomas O Arnold
Andrew K. McColpin

ATTORNEY

United States Patent Office 2,920,645
Patented Jan. 12, 1960

2,920,645
SLEEVE CHECK VALVE

Richard P. Younghaus, Houston, Tex.

Application January 11, 1957, Serial No. 633,591

5 Claims. (Cl. 137—496)

My invention relates to a sleeve check valve, primarily adapted for preventing back flow through a line. It may be successfully used in flow systems for gases or liquids.

In the more conventional type of check valve, a device is employed which utilizes either a hinged flap or a steel ball, operating on a valve seat. There are certain weaknesses inherent in this type of device. Some can be installed only in a vertical position and most exhibit a tendency toward undue wear on the flexible seals of the valve where high pressures or sudden and severe variations in pressure are encountered. In addition, abrasion in the valve seat sometimes occurs due to foreign particles in the moving fluid or gas. The necessity for obtaining a tight seal around the flap or ball precludes the use of material in the valve seat which is hard enough to resist the wear of frequent or violent closings.

Valves which have designed to overcome these shortcomings have been too complex to provide trouble-free operation, or too expensive to be economically feasible, or both.

It is therefore an object of my invention to provide a valve which is simple and rugged in construction, operable in any position and economical in cost.

It is a further object of my invention to provide a piston operated check valve which opens and closes in response to the pressure differential between its inlet and outlet.

A further object of my invention is to provide a piston operated valve which will resist the wear of frequent or extreme variations in operating pressure because of the structural arrangement of the flexible seals.

A further object is to provide a valve with design features to limit or restrain violent engagement or chatter in the valve members.

It is a further object of my invention to provide a valve having design features to predetermine the pressure differential which will bring about operation of the valve.

In carrying out my invention I propose a sleeve check valve which employs a double acting piston to bring about the opening or closing of the valve. By directing inlet pressure to one side of this piston and outlet pressure to the other, the piston can be made to move in its cylinder to produce a closed or opened valve position in response to the inlet-outlet pressure differential. The differential pressure required to produce piston movement is preferably determined in design by reducing the effective area of the appropriate pressure face of the piston. For normal operation it is necessary that the piston be biased toward the valve closed position under equalized pressure.

While my invention may take different specific forms, I have shown in the accompanying drawing, one embodiment in which the details of my invention may be illustrated.

In Fig. 1 is shown a cut-away view of my valve in the closed position.

Figure 2:
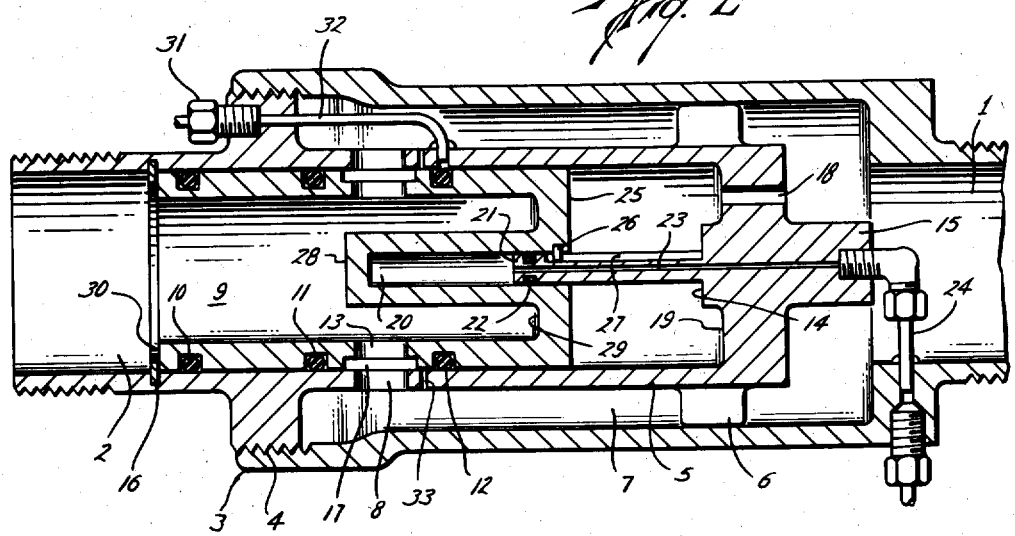

Fig. 2 represents the same view with the valve in the open position.

Referring now to the drawings and particularly to Fig. 1, the numeral 1 indicates the inlet of the valve and the numeral 2 indicates the outlet of the valve. Normal flow moves from inlet 1 to outlet 2 and the valve operates to prevent flow in the reverse direction. The valve is adapted to be threadably or otherwise attachable for interposition in a fluid system.

The cylindrical sleeve 3 housing the valve is threadably joined at 4 to a radial flange extending from a closed cylinder 5. The cylinder 5 is spaced from the sleeve 3 at one end by the flange and at the other end by a plurality of lugs 6. The resultant annular passageway 7 between the sleeve and the cylinder is in open communication with the inlet 1. A plurality of openings or ports 8 extends through the wall of cylinder 5 to form a means of communication between the passageway 7 and the inside of cylinder 5.

Inside the cylinder 5 is slidably mounted the piston 9 which is provided with O-rings 10, 11, and 12 for sealing against the internal wall of the cylinder 5. Through the lateral cylindrical wall of the piston 9 is a plurality of flow ports 13 in axial alignment with the openings 8. The flow ports 13 are moved by reciprocation of the piston between extreme positions of misalignment and full alignment with the openings 8, defining the fully opened and fully closed states of the valve. Alignment of the flow ports 13 with the openings 8 allows flow from the inlet 1 through the passageway 7, the openings 8 and the flow ports 13 and thence to the outlet 2. The cross sectional area of the openings 8 and flow ports 13 may be made equal to that of the inlet of the valve in order to insure full line flow.

The fully opened and fully closed positions of the piston are defined by the opposite limits of its stroke. Thus, its forward or valve closed position is defined by an inward extension 14 at the closed end 15 of cylinder 5 and its rearward or valve open position by a piston stop 16. These positions are illustrated in Fig. 1 and Fig. 2, respectively.

A circumferential groove 17 extends around the exterior of the piston to interconnect the flow ports 13. This eliminates the necessity for positive guides to bring the flow ports 13 into exact axial alignment with the openings 8, for the groove 17 will allow communication between the separate flow ports 13. Consequently, mere radial alignment of the ports 13 and the openings 8 will produce the desired flow through the valve. A portion of the fluid introduced into the valve through the inlet 1 is bypassed through an orifice 18 through the end wall 15 of the cylinder 5 to act on the forward face of the piston 9. Preferably, the orifice 18 opens into the annular chamber 19 surrounding the extension 14 on the end wall 15 of the cylinder 5 to provide for distribution of pressure over the forward face of the piston. Hence it is inlet fluid pressure in the chamber 19 that tends to drive the piston rearward.

In the forward face of the piston 9 is a cylindrical bore 20 which accommodates an auxiliary piston 21. O-ring seal 22 is provided on auxiliary piston 21 to prevent leakage of inlet pressure from within the cylinder 5 into the bore 20. As the piston 9 slides, the cylindrical bore 20 moves with relation to the stationary piston 21. Axially through the body of piston 22 is a vent line 23 which exhausts through suitable tubing 24 to a space of reduced pressure, for example the atmosphere, to minimize resistance to movement of the piston 9 along the auxiliary piston 21. The primary function of the auxiliary piston 21 is to reduce the effective area of the forward face 25 of piston 9 to the annular area surrounding bore 21.

If desired, as either an alternate or additional feature, a key 26 may be provided on piston 9 to operate in key slot 27 to prevent relative rotation between the piston 9 and the cylinder 5 and hence, insure axial alignment of the flow ports 13 with openings 8.

Back pressure in the system in which the valve is used is of course openly communicated through outlet 2 to the interior of cylinder 5 to act on the composite back face of the piston 9 comprising the center circular surface 28, the annular area 29 surrounding the auxiliary cylinder 28, and the annular area 30 at the rear edge. This pressure drives the piston 9 forward. Since the area of the composite back face of the piston is substantially equal to the cross sectional area of the cylinder, and therefore exceeds the area of the front face by an amount equal to the cross sectional area of the bore 20, the piston will be biased toward its fully closed position shown in Fig. 1 when the inlet pressure and back pressure are equalized.

In operation the speed with which the piston 9 moves is a function of the speed with which fluid can enter or leave the space 19 through orifice 18. In designing a valve of this type for a specific installation the viscosity of the fluid to be handled and the expected variations in operating pressure can be considered in selecting an orifice size which will produce quiet operation, free of valve chatter, and preclude violent valve engagement.

For valve installations which are not self-lubricating, a lubrication fitting 31 is provided. Suitable lubricants introduced at this point are directed through tubing 32 to the space between the internal walls of the cylinder 5 and the piston 9.

It is anticipated that in some installations of this valve, sudden pressure differentials may be encountered. To prevent, in such contingency, any damage to the central O-ring seal 11 as the piston 9 moves rearward, a plurality of relief holes 33 are provided. These holes are for the purpose of introducing inlet pressure into the space between the external walls of piston 9 and the internal walls of cylinder 5 at a point on the side of O-ring 11 opposite the opening 8. This serves to approximately equalize the pressures on each side of the O-ring as it nears opening 8, and prevents its being squeezed out and pinched against the edge of the opening. The problem solved by these relief holes is present in all piston operated valves which involve the use of a flexible seal which slides by a lateral opening in the cylinder wall. Pressure which acts against only one side of the seal during its sliding movement tends to deform the seal and force it from its seat into a position where it may be damaged by the edges of the opening. My invention extends the field of useful application of this type of seal into an area heretofore considered unfeasible.

Although I have described my invention as a check valve, it may be used as a safety or pressure relief valve with no structural changes. Instead of preventing back flow through a line, it could function to prevent pressure in a chamber from exceeding a certain point, so long as that point was measured in terms of its differential with regard to the pressure which was supplied to the outlet chamber of the valve.

While one embodiment of my invention has been shown and described, it is obvious that many modifications thereof can be made by one skilled in the art without departing from the spirit of my invention. It is therefore, desired to protect by Letters Patent all forms of the invention falling within the scope of the following claims.

I claim:

1. A sleeve check valve comprising a valve body, said valve body having a bore therein, a double acting piston slidable within said bore, an upstream flow passageway connected to said valve body and opening into said bore at a point intermediate the ends thereof, a pressure conduit interconnecting said upstream flow passageway and the forward end of said bore, a downstream flow passageway opening from the rearward end of said bore behind said piston, a valve member carried by said piston and extending rearward therefrom to cover said upstream flow passageway opening throughout said piston's stroke, a port through said valve member so situated as to be in communication with said upstream passageway opening when said piston is moved toward the rearward end of said bore, a plunger and a receptacle slidably receiving said plunger on the upstream side of said piston, one of said plunger and receptacle being on said piston and the other of said plunger and receptacle being on said valve body, said plunger being longitudinally slidable in said receptacle throughout movement of said piston.

2. A sleeve check valve comprising a valve body, said valve body having a bore therein, a double acting piston slidable within said bore, an upstream flow passageway opening into said bore at a point intermediate the ends thereof, a pressure conduit interconnecting said upstream flow passageway and the forward end of said bore, a downstream flow passageway opening from the rearward end of said bore, a valve member carried by said piston and extending rearward from said piston to cover said upstream flow passageway opening throughout said piston's stroke, a port through said valve member so situated as to be in communication with said upstream passageway opening when said piston is in a rearward position, an auxiliary bore extending into the forward face of said piston, an auxiliary piston fixed to said valve body and slidable within said auxiliary bore and a venting conduit interconnecting said auxiliary bore in front of said auxiliary piston and a space of reduced pressure.

3. A sleeve check valve comprising a valve housing, said valve housing having an inlet opening through one wall thereof, a valve body extending through another wall of said valve housing, said valve body being spaced within said housing to form a valve chamber therearound, said valve body having an axial bore extending into said valve body from outside said valve housing with an open end outside said valve housing and a closed end within said valve housing, lateral openings in said valve body interconnecting said valve chamber and said bore intermediate said ends, a double acting piston slidably located within said bore and operable over a distance between said lateral openings and said closed end of said bore, a pressure conduit through said valve body interconnecting said valve chamber and said closed end of said bore, a valve closing member carried by said piston and extending toward said open end of said bore to cover said lateral openings throughout the stroke of said piston, ports through said valve member so situated as to be in communication with said lateral openings when said piston is at a position toward the open end of said bore, an auxiliary bore extending into the forward face of said piston, an auxiliary piston fixed to said valve body and located within said auxiliary bore, said piston being slidable on said auxiliary piston, and a venting conduit interconnecting said auxiliary bore in front of said auxiliary piston and a space of reduced pressure.

4. A sleeve check valve comprising a valve housing, said valve housing having an inlet opening through one wall thereof, a valve body extending through another wall of said valve housing, said valve body being spaced within said housing to form a valve chamber therearound, said valve body having an axial bore extending into said valve body from outside said valve housing with an open end outside said valve housing and a closed end within said valve housing, lateral openings in said valve body interconnecting said valve chamber and said bore intermediate said ends, lateral relief ports in said valve body interconnecting said valve chamber and said bore, said relief ports being spaced toward said closed end of said bore from said openings, a double acting piston slidably located within said bore and operable over a distance between said lateral openings and said closed end of said bore, an annular groove about the periphery of said piston, a resilient annular seal carried within said groove, a pressure conduit through said valve body interconnecting said valve chamber and said closed end of said bore, a valve closing member carried by said piston and extending toward said open end of said bore to cover said lateral openings throughout the stroke of said piston, ports through said valve member so situated as to be in communication with said lateral openings when said piston is at a position toward the open end of said bore, an auxiliary bore extending into the forward face of said piston, an auxiliary piston fixed to said valve body and located within said auxiliary bore, said piston being slidable on said auxiliary piston, and a venting conduit interconnecting said auxiliary bore in front of said auxiliary piston and a space of reduced pressure.

5. A valve comprising a valve body, said valve body having a bore therein, a passageway connected to said valve body and terminating in a flow port opening laterally into said bore, said passageway being in open communication with a source of pressure fluid, a piston slidable within said bore, means for moving said piston selectively to cover and uncover said flow port, a resilient sealing ring carried on said piston and movable therewith across said flow port, and a relief port opening into said bore at a point spaced axially from said flow port in the direction from which said sealing ring moves with said piston across said flow port, said relief port being in communication with said source of pressure fluid.

References Cited in the file of this patent

UNITED STATES PATENTS

| Number | Name | Date |
|---|---|---|
| 759,396 | Rutenber | May 10, 1904 |
| 836,347 | Tittelback | Nov. 20, 1906 |
| 1,950,847 | Harrub | Mar. 13, 1934 |
| 2,361,225 | Meyer | Oct. 24, 1944 |
| 2,555,334 | Green | June 5, 1951 |
| 2,644,481 | Perlman | July 7, 1953 |